(12) United States Patent
Kim et al.

(10) Patent No.: US 9,344,190 B2
(45) Date of Patent: May 17, 2016

(54) FLEXIBLE PLACEMENT OF SPECTRAL INVERTERS IN OPTICAL NETWORKS

(71) Applicants: Inwoong Kim, Allen, TX (US); Olga Vassilieva, Plano, TX (US); Paparao Palacharla, Richardson, TX (US); Motoyoshi Sekiya, Richardson, TX (US)

(72) Inventors: Inwoong Kim, Allen, TX (US); Olga Vassilieva, Plano, TX (US); Paparao Palacharla, Richardson, TX (US); Motoyoshi Sekiya, Richardson, TX (US)

(73) Assignee: Fujitsu Limited, Kawasaki-shi (JP)

( * ) Notice: Subject to any disclaimer, the term of this patent is extended or adjusted under 35 U.S.C. 154(b) by 66 days.

(21) Appl. No.: 14/120,298

(22) Filed: May 14, 2014

(65) Prior Publication Data

US 2015/0333825 A1    Nov. 19, 2015

(51) Int. Cl.
*H04B 10/079* (2013.01)
*H04B 10/2507* (2013.01)
*H04B 10/2531* (2013.01)

(52) U.S. Cl.
CPC ................................. *H04B 10/07953* (2013.01)

(58) Field of Classification Search
CPC ........... H04B 10/2531; H04B 10/2507; H04B 10/25073; H04B 10/07953
USPC .................................. 398/25, 26, 58, 147, 150
See application file for complete search history.

(56) References Cited

U.S. PATENT DOCUMENTS

| | | | | |
|---|---|---|---|---|
| 2003/0099014 | A1* | 5/2003 | Egner | H04J 14/0227 398/79 |
| 2003/0118347 | A1* | 6/2003 | Papaparaskeva | H04B 10/2531 398/147 |
| 2004/0047028 | A1* | 3/2004 | Ng | H04B 10/2935 359/341.41 |
| 2006/0250678 | A1* | 11/2006 | Minzioni | H04B 10/2531 359/333 |
| 2010/0040365 | A1* | 2/2010 | Kit Leung | H04J 14/0227 398/26 |

OTHER PUBLICATIONS

Bergano et al., "Margin Measurements in Optical Amplifier Systems", *IEEE PTL*, 5(304), 5 pages, 1993.
Danish Rafique et al., "Nonlinearity Compensation via Spectral Inversion and Digital Back-Propagation: A Practical Approach", OM3A.1., OFC/NFOEC 2012, 3 pages, 2012.
(Continued)

*Primary Examiner* — Dalzid Singh
(74) *Attorney, Agent, or Firm* — Bake Botts L.L.P.

(57) ABSTRACT

Methods and systems are provided for flexible placement of spectral inverters in an optical network. The method includes identifying a first transmission path coupling a transmitter and a receiver. The first transmission path includes a first node for assignment of a first spectral inverter. The method further includes estimating a first optical signal-to-noise ratio (OSNR) penalty of nonlinear phase noise (NLPN) on the first transmission path with the first spectral inverter assigned to the first node, and based on the first estimated OSNR penalty of NLPN being less than an NLPN penalty threshold, assigning the first spectral inverter to the first node.

17 Claims, 8 Drawing Sheets

(56) References Cited

OTHER PUBLICATIONS

W. Shieh et al., "Equalization-enhanced phase noise for coherent-detection systems using electronic digital signal processing", *Optics Express*, p. 15718-15727, 2008.

S.L. Jansen et al., "The impact of asymmetric placement of a spectral inverter in a 40Gbit/s system", ECOC2004_Th2.5.6, 2 pages, 2004.

S.L. Jansen et al., "Optical Phase Conjugation for Ultra Long-Haul Phase-Shift-Keyed Transmission", *Journal of Lightwave Technology*, p. 54-64, 2006.

S.L. Jansen et al., "Long-Haul DWDM transmission systems employing optical phase conjugation", *IEEE JSTQE*, pp. 505-520, 2006.

Mable P. Fok et al., "Polarization-Insensitive Wavelength Conversion of DPSK Signal Using Four-Wave Mising in 32-cm Bismuth-Oxide Highly Nonlinear Fiber", *CLEO*, 2 pages, 2007.

Axel Klekamp et al., "Coherent Intradyne Opto-Electro-Optic Spectral inverter and its Application for SPM Mitigation and Wavelength Conversion", *ECOC* 2013, 3 pages, 2013.

* cited by examiner

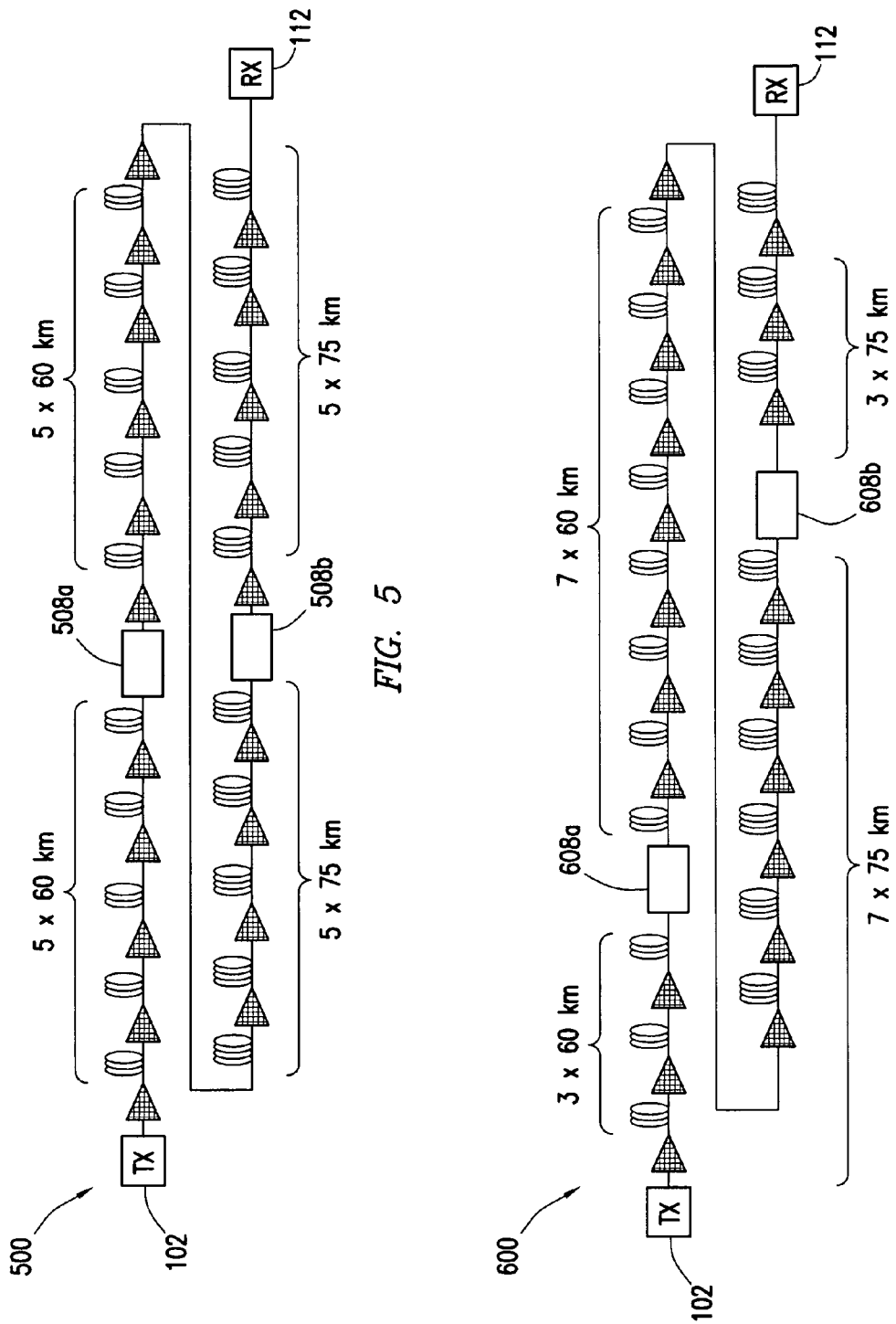

FLEXIBLE PLACEMENT OF SPECTRAL INVERTERS IN OPTICAL NETWORKS

TECHNICAL FIELD OF THE INVENTION

The present disclosure relates generally to optical communication networks and, more particularly, to flexible placement of spectral inversion for optical networks.

BACKGROUND

Telecommunications systems, cable television systems and data communication networks use optical networks to rapidly convey large amounts of information between remote points. In an optical network, information is conveyed in the form of optical signals through optical fibers. Optical networks may also include various subsystems, such as amplifiers, dispersion compensators, multiplexer/demultiplexer filters, wavelength selective switches, spectral inverters, couplers, etc. configured to perform various operations within the network.

The distance that an optical signal can be transmitted with optical amplifiers for a given data rate depends on the impairments in the transmission system. Impairments can include accumulated amplified spontaneous emission (ASE) noise, chromatic dispersion (CD), nonlinear optical effects (such as nonlinear phase noise), polarization mode dispersion, and polarization dependent loss. Digital signal processing (DSP) in coherent optical receivers may compensate for linear impairments such as CD, polarization mode dispersion and polarization dependent loss effectively. Intra-channel nonlinear impairment may also be compensated using digital back propagation in a coherent optical receiver with DSP, but it requires high computation power, which increases with optical signal bandwidth. Typically, the higher the data rate and the denser the wavelength spacing, the more susceptible the transmission system is to impairments.

Nonlinear phase noise (NLPN) may be mitigated by mid-span spectral inversion when the optical signal is transmitted across multiple spans. Mid-span spectral inversion may be achieved optically (e.g., optical phase conjugation based on optical parametric process) or electronically (e.g., Optical-Electrical-Optical (O-E-O)). Spectral inverters (SIs) may be configured to change or maintain the wavelength after spectral inversion. The accumulated CD and NLPN of an optical signal starts to be reversed after spectral inversion. Thus, to have best compensation of CD and NLPN, placement of SIs has been limited to the mid-point of a transmission link, such that the link is symmetric with respect to the SI. In real world systems, symmetric placement for SIs may not be feasible or practical.

SUMMARY

In particular embodiments, a method for flexible placement of spectral inverters in an optical network is provided. The method includes identifying a first transmission path coupling a transmitter and a receiver. The first transmission path includes a first node for assignment of a first spectral inverter. The method further includes estimating a first optical signal-to-noise ratio (OSNR) penalty of nonlinear phase noise (NLPN) on the first transmission path with the first spectral inverter assigned to the first node, and based on the first estimated OSNR penalty of NLPN being less than an NLPN penalty threshold, assigning the first spectral inverter to the first node.

In another embodiment, an optical network system for flexible placement of spectral inverters is provided. The system includes a transmitter, a receiver coupled to receive a signal transmitted by the transmitter, and a first transmission path coupling the transmitter and the receiver. The first transmission path includes a first node. The optical network system also includes a first spectral inverter assigned to the first node on the first transmission path. The first node selected for assignment based on estimating a first OSNR penalty of NLPN on the first transmission path with the first spectral inverter assigned to the first node, and based on the first estimated OSNR penalty of NLPN being less than an NLPN penalty threshold, assigning the first spectral inverter to the first node.

In another embodiment, a system for flexible placement of spectral inverters is provided. The system includes a processor configured to access non-transitory computer readable memory media. The memory media stores processor-executable instructions, and the instructions, when executed by a processor, cause the processor to identify a first transmission path coupling a transmitter and a receiver. The first transmission path includes a first node for assignment of a first spectral inverter. The system further includes instructions to estimate a first OSNR penalty of NLPN on the first transmission path with the first spectral inverter assigned to the first node, and based on the first estimated OSNR penalty of NLPN being less than an NLPN penalty threshold, assign the first spectral inverter to the first node.

BRIEF DESCRIPTION OF THE DRAWINGS

For a more complete understanding of the present invention and its features and advantages, reference is now made to the following description, taken in conjunction with the accompanying drawings, in which:

FIG. 5 illustrates a block diagram of an example optical transmission path with symmetric multiple SI placement, in accordance with one embodiment of the present disclosure;

FIG. 6 illustrates a block diagram of an example optical transmission path with asymmetric multiple SI placement, in accordance with one embodiment of the present disclosure;

DETAILED DESCRIPTION

Embodiments of the present invention and its advantages are best understood by referring to FIGS. 1-9 of the drawings, like numerals being used for like and corresponding parts of the various drawings.

Figure 1:
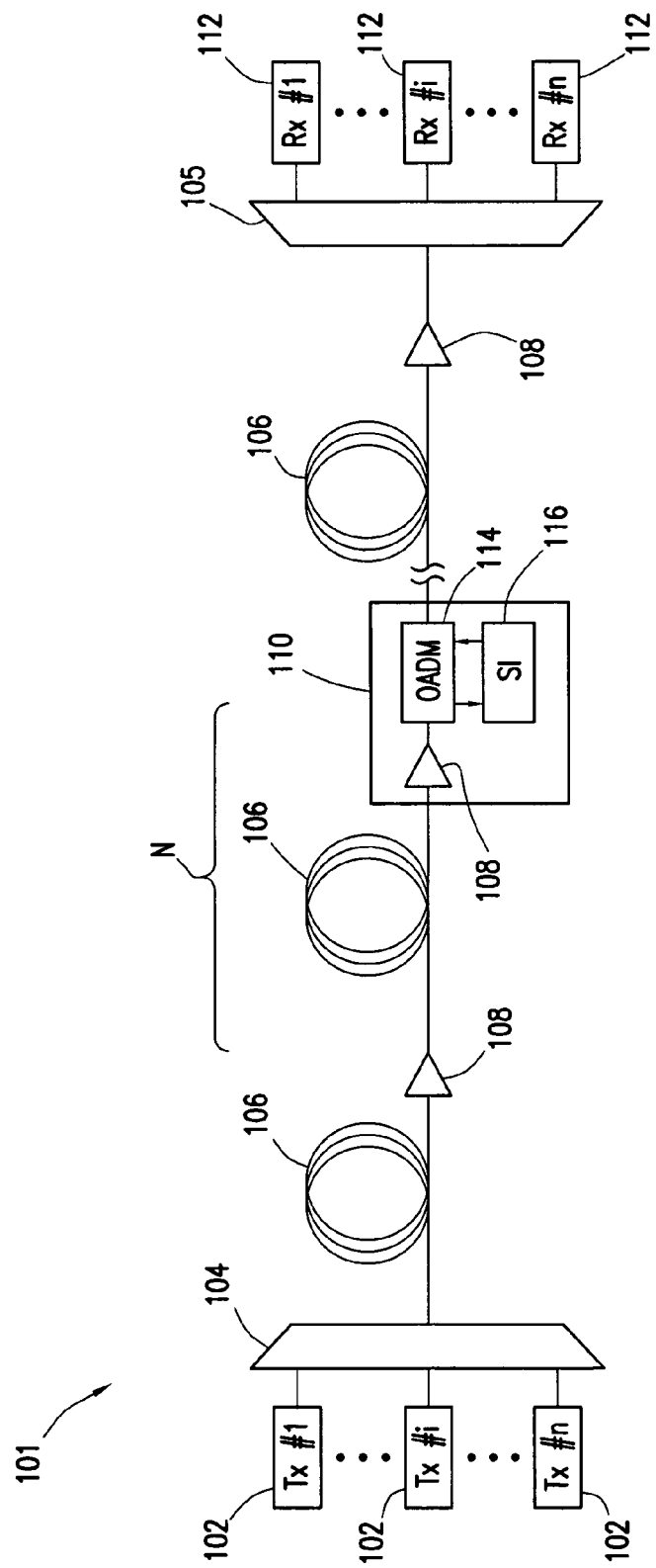
FIG. 1 illustrates a block diagram of an example optical network, in accordance with one embodiment of the present disclosure.

FIG. 1 illustrates a block diagram of an example optical network 101, in accordance with one embodiment of the present disclosure. In certain embodiments, optical network 101 may be any network utilized for telecommunications, data communications, and/or any other suitable function. Although FIG. 1 illustrates a particular embodiment and configuration of optical network 101, other suitable types of optical networks may be utilized. Optical network 101 may be a point-to-point optical network with terminal nodes, a ring optical network, a mesh optical network, or any other suitable optical network or combination of optical networks. In certain embodiments, optical network 101 may include a number of optical channels that are carried over a common path at different wavelengths. To increase the information carrying capabilities of optical network 101, multiple signals transmitted at multiple channels may be combined into a single optical signal. Optical network 100 may represent all or a portion of a metropolitan network, a long-haul network, or any other suitable network or combination of networks.

As shown, optical network 101 may depict elements that carry user data and comprise network equipment. Accordingly, optical network 101 may include one or more optical fibers 106 configured to transport one or more optical signals communicated by components of optical network 101. The network elements of optical network 101, coupled together by optical fibers 106, may comprise one or more transmitters 102, one or more multiplexers (MUX) 104, one or more nodes 110, one or more amplifiers 108, one or more demultiplexers 105, and one or more receivers 112.

Optical fibers 106 may comprise thin strands of glass capable of communicating the signals over long distances with very low loss. Optical fibers 106 may be any suitable type of fiber, such as a Single-Mode Fiber (SMF), Enhanced Large Effective Area Fiber (ELEAF), or a TrueWave® Reduced Slope (TW-RS) fiber. Optical fibers 106 may include periodic segments of dispersion compensating fiber (DCF), which has the opposite dispersion sense as fiber used for transmission and can compensate for multiple wavelengths simultaneously. Optical fibers 106 may include multiple spans or segments. For example, a section of optical fiber 106 may be composed of N spans. Spans may be separated by nodes 110, amplifiers 108, or any other suitable equipment.

Optical network 101 may include devices configured to transmit optical signals over optical fibers 106. Information may be transmitted and received through network 101 by modulation of one or more wavelengths of light to encode the information on the wavelength. In optical networking, a wavelength of light may also be referred to as a channel. Each channel may be configured to carry a certain amount of information through optical network 101.

To increase the information carrying capabilities of optical network 101, multiple signals transmitted at multiple channels may be combined into a single optical signal. The process of communicating information at multiple channels of a single optical signal is referred to in optics as wavelength division multiplexing (WDM). Dense wavelength division multiplexing (DWDM) refers to the multiplexing of a larger (denser) number of wavelengths, usually greater than forty, into a fiber. WDM, DWDM, or other multi-wavelength transmission techniques are employed in optical networks to increase the aggregate bandwidth per optical fiber. Without WDM or DWDM, the bandwidth in optical networks may be limited to the bit-rate of solely one wavelength. With more bandwidth, optical networks are capable of transmitting greater amounts of information. Optical network 101 may be configured to transmit disparate channels using WDM, DWDM, or some other suitable multi-channel multiplexing technique, and to amplify the multi-channel signal.

Optical network 101 may include one or more optical transmitters (Tx) 102 configured to transmit optical signals through optical network 101 in specific wavelengths or channels. Transmitters 102 may comprise any system, apparatus or device configured to convert an electrical signal into an optical signal and transmit the optical signal. For example, transmitters 102 may each comprise a laser and a modulator configured to receive electrical signals and modulate the information contained in the electrical signals onto a beam of light produced by the laser at a particular wavelength and transmit the beam carrying the signal throughout the network. Multiplexer 104 may be coupled to transmitters 102 and may be any system, apparatus or device configured to combine the signals transmitted by transmitters 102, in individual wavelengths, into a single WDM or DWDM signal. In some embodiments, transmitters 102 and/or multiplexer 104 may be configured within one or more nodes 110.

Amplifiers 108 may amplify the multi-channeled signals within optical network 101. Amplifiers 108 may be positioned before and/or after certain lengths of optical fibers 106 or within nodes 110. Amplifiers 108 may comprise any system, apparatus, or device configured to amplify signals. For example, amplifiers 108 may comprise an optical repeater that amplifies the optical signal. This amplification may be performed with opto-electrical or electro-optical conversion. In some embodiments, amplifiers 108 may comprise an optical fiber doped with a rare-earth element. When a signal passes through the fiber, external energy may be applied to excite the atoms of the doped portion of the optical fiber, which increases the intensity of the optical signal. As an example, amplifiers 108 may comprise an erbium-doped fiber amplifier (EDFA). In various embodiments, other suitable amplifiers, such as a semiconductor optical amplifier (SOA), may be used.

One or more node 110 may be coupled to optical network 101 via optical fibers 106 also. Node 110 may include various types of equipment including optical add/drop multiplexers (OADMs), amplifiers 108, spectral inverters (SIs), or any other suitable equipment. A signal may reach node 110 after traversing a number of spans, such as N spans. After passing through node 110, a signal may travel along optical fibers 106 directly to a destination, or the signal may be passed through one or more additional nodes 110 and/or amplifiers 108 before reaching a destination. In some embodiments, at ODAM 114, an optical signal may be dropped for spectral inversion to SI 116 and added after SI 116. Further, additional components, such as an additional amplifier 108 (not expressly shown), may be utilized in the transmission path after SI 116 for the optical signal to have sufficient optical fiber launching power based on the configuration and output power from SI 116.

Optical network 101 may also include one or more demultiplexers 105 at one or more destinations of optical network 101. Demultiplexer 105 may comprise any system apparatus or device that may act as a demultiplexer by splitting a single WDM signal into its individual channels. For example, optical network 101 may transmit and carry a forty channel DWDM signal. Demultiplexer 105 may divide the single, forty channel DWDM signal into forty separate signals according to the forty different channels.

Optical network 101 may also include receivers 112 coupled to demultiplexer 105. Each receiver 112 may be configured to receive signals transmitted in a particular wavelength or channel, and process the signals for the information that they contain. Accordingly, optical network 101 may include at least one receiver 112 for every channel of the network.

As used herein, "traffic" means information transmitted, stored, or sorted in the network. Such traffic may comprise optical signals having at least one characteristic modulated to encode audio, video, textual, real-time, non-real-time and/or other suitable data. Additionally, the information carried by this traffic may be structured in any suitable manner. Optical network 101 may be configured to communicate traffic structured in the form of optical frames, as packets, or in any other appropriate manner.

Optical networks, such as optical network 101, may further employ modulation schemes to convey information in the optical signals over the optical fibers. Such modulation schemes may include phase-shift keying (PSK), frequency-shift keying (FSK), amplitude-shift keying (ASK), and quadrature amplitude modulation (QAM). In PSK, the information carried by the optical signal may be conveyed by modulating the phase of a reference signal, also known as a carrier wave, or simple, a carrier. The information may be conveyed by modulating the phase of the signal itself using differential phase-shift keying (DPSK). In QAM, the information carried by the optical signal may be conveyed by modulating both the amplitude and phase of the carrier wave. PSK may be considered a subset of QAM, wherein the amplitude of the carrier waves is maintained as a constant.

PSK and QAM signals may be represented using a complex plane with real and imaginary axes on a constellation diagram. The points on the constellation diagram representing symbols carrying information may be positioned with uniform angular spacing around the origin of the diagram. The number of symbols to be modulated using PSK and QAM may be increased and thus increase the information that can be carried. The number of signals may be given in multiples of two. As additional symbols are added, they may be arranged in uniform fashion around the origin. PSK signals may include such an arrangement in a circle on the constellation diagram, meaning that PSK signals have constant power for all symbols. QAM signals may have the same angular arrangement as that of PSK signals, but include different amplitude arrangements. QAM signals may have their symbols arranged around multiple circles, meaning that the QAM signals include different power for different symbols. This arrangement may decrease the risk of noise as the symbols are separated by as much distance as possible. A number of symbols "m" may thus be used and denoted "m-PSK" or "m-QAM."

Examples of PSK and QAM with a different number of symbols can include binary PSK (BPSK or 2-PSK) using two phases at 0° and 180° (or 0 and $\pi$) on the constellation diagram; or quadrature PSK (QPSK, 4-PSK, or 4-QAM) using four phases at 0°, 90°, 180°, and 270° (or 0, $\pi/2$, $\pi$, and $3\pi/2$). Phases in such signals may be offset. This may be extended, for example, up to 16-QAM, using sixteen phases. These various signals (for example, 2-PSK or 16-QAM) may be arranged in one circle on the constellation diagram. M-PSK signals may also be polarized using techniques such as dual-polarization QPSK (DP-QPSK), wherein separate m-PSK signals are multiplexed by orthogonally polarizing the signals. Advanced modulation techniques enable higher data rates and improved compensation for optical impairments.

The distance that an optical signal can be transmitted for a given data rate depends on the impairments in the transmission system. Impairments can include loss, chromatic dispersion (CD), nonlinear (NL) optical effects (such as nonlinear phase noise (NLPN)), polarization mode dispersion (PMD), polarization dependent loss (PDL), amplified spontaneous emission (ASE) and/or other impairments may affect optical signals within the optical signal transmission path. Advanced modulation techniques may require a higher optical signal-to-noise ratio (OSNR). OSNR directly relates to distances optical signals can travel before requiring regeneration, also called optical reach. Regeneration may involve electrically regenerating the optical signal using optical-electrical-optical (O-E-O) regenerators, referred to herein as "regenerators." Thus, higher order modulation formats, such as 16-QAM, may have lower optical reach than QSPK formats. Additionally, the bit error rate (BER) in an optical transmission system may be set by the OSNR, thus the estimated OSNR may be used to predict BER. The OSNR may indicate the instantaneous quality of a signal. As a signal passes through a network, it may lose signal strength or may increase in noise, resulting in a decrease of the overall OSNR. If OSNR drops below a certain point, the signal may be unreadable at a desired destination. Additionally, BER in a transmission is the percentage of bits that have errors relative to the total number of bits transmitted.

NL optical effects may increase with increasing optical power in each optical wavelength. A signal may also be impacted by NLPN resulting from cross talk between two orthogonal polarization components. NLPN accumulates span after span and can result from intra- and inter-channel nonlinearities such as self-phase modulation (SPM) and cross phase modulation (XPM) that convert amplitude noise to phase noise. SPM occurs when the amplitude of a signal modulates the refractive index of the optical fiber and imposes as a phase modulation on the signal itself, e.g., SPM introduces a chirp on the signal. XPM occurs when the amplitude modulation of a signal imposes a phase modulation on another signal, typically on another wavelength or on another optical polarization. SPM and XPM may cause severe distortion on transmitted data. An NLPN penalty threshold may be set or calculated for transmission between a particular transmitter and receiver.

Multiple method and techniques may be utilized to compensate for impairments in the transmission system. Loss may be addressed by using amplifiers 108 in the transmission system. Improvements in OSNR may be made by increasing launching power, however, this may also increase NLPN. Further, digital back-propagation (DBP), which mitigates NLPN penalty, may require increased computation power at receiver 112 that may not be available or feasible. Coherent receivers may compensate for CD.

NLPN, especially SPM, may be compensated using digital back propagation (DBP). However, DBP may necessitate high computation power that increases with signal bandwidth. For example, in applications utilizing a superchannel, which is a set of tightly packed sub-channels transmitted as a single entity. (e.g. 2×200 G or 4×100 G for 400 G superchannel), DBP may require excessive computation power to compensate NLPN. If DBP is implemented only for sub-channels, XPM between sub-channels may not be compensated (e.g., DBP may compensate SPM only). Thus, in some embodiments, SIs may be utilized to compensate for NLPN in transmission of a superchannel. Optical phase conjugation (OPC) based on optical parametric process may invert the optical spectrum of a superchannel (multiple sub-channels) essentially simultaneously, and may mitigate SPM of each sub-channel and XPM between sub-channels. OPC is a technique for generating a complex conjugate signal of an input optical signal. The optical spectrum of a phase conjugated signal is inverted SIs 116 use nonlinear optics or O-E-O to generate a phase conjugated signal or inverted optical spectrum of the optical signal. Depending on the configuration of SI 116, the optical carrier frequency may be shifted. After inversion, the signal impairment due to dispersion and nonlinearity in a fiber is compensated as the signal propagates along a remaining fiber having similar dispersion and nonlinear properties. An OPC-based SI may be able to serve multiple WDM channels essentially simultaneously. Thus, two different flows of traffic may utilize a particular OPC-based SI. SIs 116 may be used to compensate for optical impairments and reduce the nonlinear distortion of an optical signal in optical network 101. Another type of SI 116 may be based on pre-dispersed spectral inversion (PSI) to compensate NLPN by improving the symmetry of optical signal power profile with respect to SI 116. With PSI, a dispersion compensation module may be inserted just before the SI.

In some embodiments, an SI may be placed at any location within the transmission link. Placement of SIs in a transmission link can be symmetric (e.g., the length of the fiber on either side of the SI is approximately the same) or asymmetric (e.g., the length of the fiber on each side of the SI is not the same). By spectral inversion of the optical signal in the middle of the optical link (symmetric placement of SI) linear and NL phase distortion effects in the first half of the optical fiber may, in principle, be counteracted in the second half of the optical fiber such that the linear and nonlinear phase distortion may be fully compensated. However, asymmetric transmission link placement of SI, may be possible because the uncompensated or residual linear and nonlinear phase distortion effects may be compensated at a coherent receiver 112. A coherent receiver may be a receiver with coherent detection and a digital signal processor (DSP). Linear distortion due to CD may be compensated by a DSP in a coherent receiver, but there may be NLPN that may not be fully compensated (e.g., residual NLPN).

In some embodiments, there may be several techniques to compensate for left over NLPN including use of DBP, which may entail measurement of left over NLPN. However, in some embodiments, when SI is placed at a point in the transmission path, SI may partially mitigate accumulated NLPN without needing a measurement of residual NLPN. SI may not need to be placed at the mid-point to recover_error free data if the BER before forward error correction (FEC) is less than a selected threshold. FEC is a method of error control that involves a source (transmitter) sending redundant data and the destination (receiver) recognizing only a portion of the data that contains no apparent errors.

Accordingly, placement of an SI in a transmission path, for a given source and destination in the optical network, may be based on minimizing BER. Thus, SIs may be placed asymmetrically in a transmission path with a coherent receiver. The effective length of a span, where NLPN accumulates, may not vary significantly in a real system, and the NLPN accumulation per span may be small. Additionally, even if NLPN compensation is not complete due to SI placement offset from mid-span, it may still be partially mitigated by SIs. BER of received signal before FEC may increase as an SI is placed further from mid-span. However, if BER of received signal before FEC can meet FEC threshold, error free data may still be recovered. Thus, systems and methods are needed to enable asymmetric or flexible placement of SIs.

Moreover, mid-spectral inversion, or placing an SI at the midpoint of the transmission link, may not be feasible or optimal and thus, may limit the application of SIs if symmetric placement is required. Although asymmetric SI placement may introduce NL impairments, these impairments may be characterized for a given transmission path. Additionally, more than one SI can be placed in the transmission path for improved symmetry or performance. In some embodiments, SIs may be placed based on the impairment estimation in mesh networks to achieve a desired optical reach. Accordingly, in some embodiments, the present disclosure relates to an algorithm that can be used by a network design application (e.g., NETSMART 2000) to determine the optimal placement of SIs within the network.

Modifications, additions or omissions may be made to optical network 101 without departing from the scope of the disclosure. For example, optical network 101 may include more or fewer elements than those depicted. Additionally optical network 101 may include additional elements not expressly shown, such as a dispersion compensation module. Also, as mentioned above, although depicted as a point-to-point network, optical network 101 may comprise any suitable network for transmitting optical signals such as a ring or mesh network.

Figure 2:
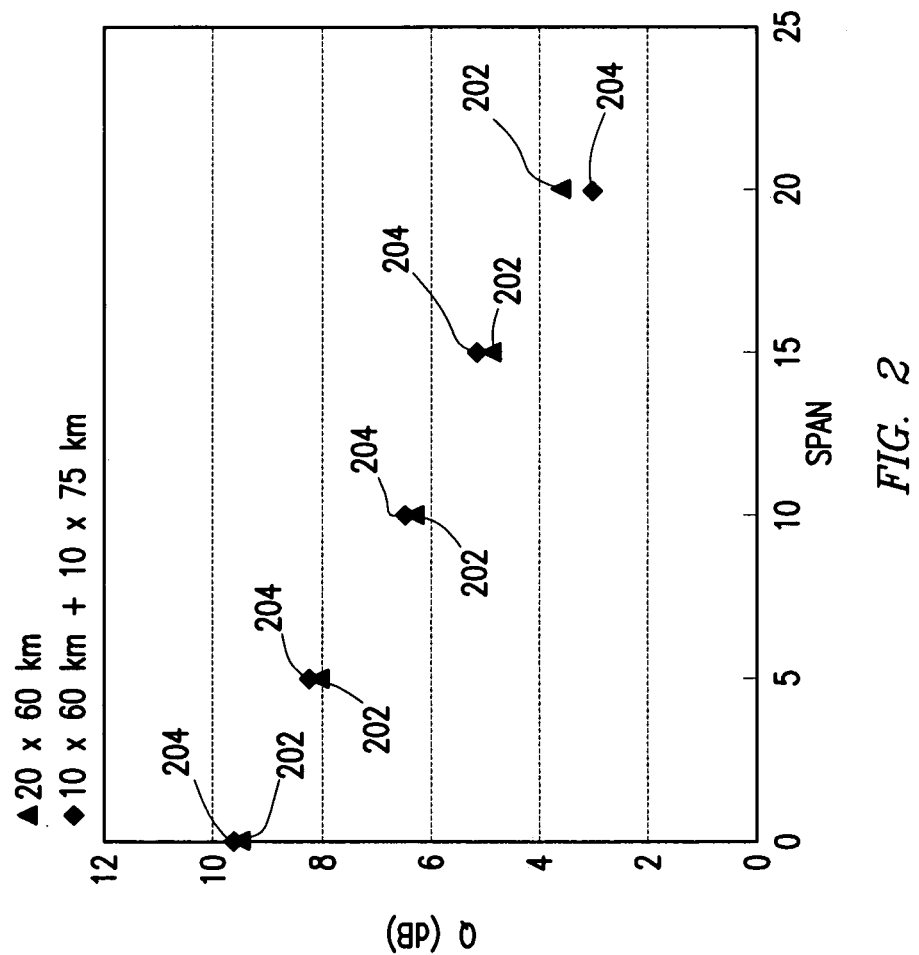
FIG. 2 illustrates a graph of the Q-factor for optical transmission without utilizing spectral inverters (SIs) as a function of the number of spans for a fixed optical signal to noise ratio (OSNR), in accordance with one embodiment of the present disclosure.

FIG. 2 illustrates a graph of the Q-factor for optical transmission without utilizing SIs as a function of the number of spans for a fixed OSNR, in accordance with one embodiment of the present disclosure. Q-factor is a measure of system performance and is to some extent proportional to the OSNR. Two simulations performed without any SIs are represented in FIG. 2. The simulations may be based on approximately the same launching power, data rates and modulation. For example, the launching power may be approximately four decibel-milliwatts (dBm) and the data rate and modulation may be approximately 200 G and DP-16QAM. The back-to-back Q-factor may be approximately 9.6 dB at OSNR of 22 dB. The first simulation, shown as plot points 202, represent a network with approximately twenty spans of approximately sixty kilometer standard single mode fibers each (e.g., 20×60 km). The second simulation, shown as plot points 204, represent a network with approximately ten spans of approximately sixty kilometers each and approximately ten spans of approximately seventy-five kilometers each (e.g., 10×60 km+10×75 km). As can be seen, the Q-factor for both simulations is small. Accordingly, an optical signal will not be transmitted through all of the spans in either of the simulations. Further, the difference in Q-factor between the two simulations, plot points 202 and 204, is negligible at the full twenty spans. Thus, SIs may be utilized to improve the transmission quality and optical reach of the optical signals.

Figure 3:
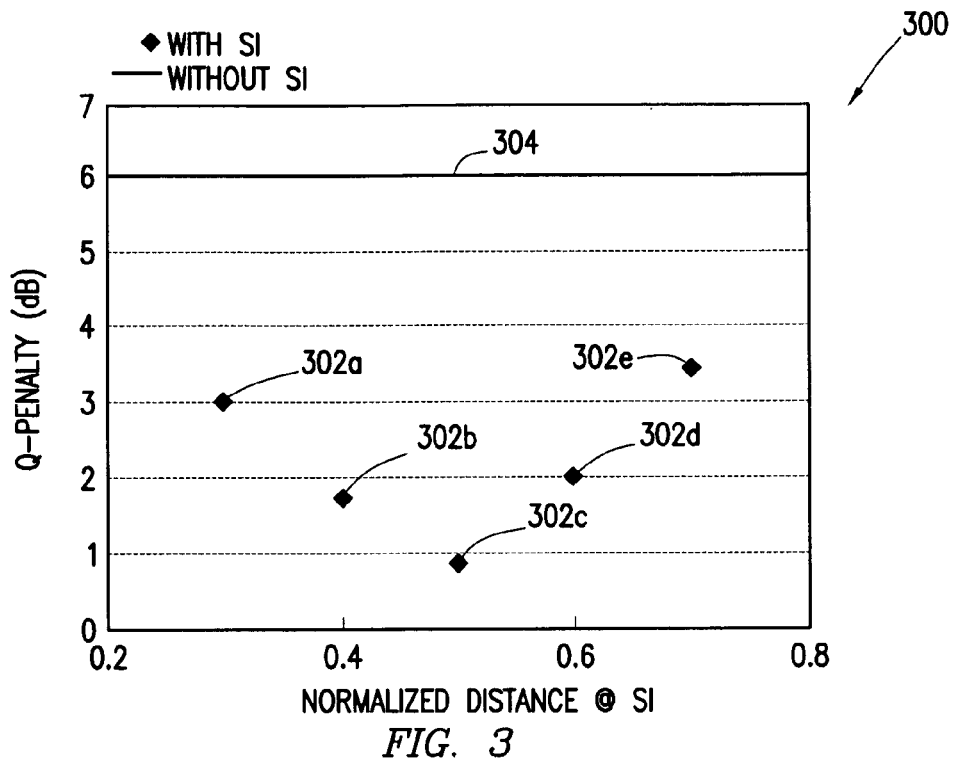
FIG. 3 illustrates a graph of the Q-penalty for optical transmission in a first simulation utilizing SIs as a function of normalized distance of SI placement, in accordance with one embodiment of the present disclosure.

FIG. 3 illustrates graph 300 of the Q-penalty for optical transmission in the first simulation utilizing SIs as a function of normalized distance of SI placement, in accordance with one embodiment of the present disclosure. Normalized distance is the distance from a source to SI placement divided by total transmission distance. FIG. 3 is based on the first simulation discussed with reference to FIG. 2, e.g., 20×60 km spans. To generate plot points 302a-302e, SIs are placed at different locations along the transmission path. For example, plot point 302a corresponds to an SI placed after six spans, and plot point 302b corresponds to an SI placed after eight spans. Plot points 302c, 302d, and 302e corresponds to an SI placed after ten, twelve, and fourteen spans, respectively. Line 304 may represent the Q-penalty for the simulation without any SIs.

As can be seen from graph 300, optimum performance may be achieved with mid-span placement of SI, e.g., after ten spans. However, even at large asymmetric SI placement of approximately 20% of transmission distance, e.g., plot points 302a and 302e, the Q-penalty mitigation by SI remains greater than approximately three dB compared to transmission performance without SI (line 304). Thus, Q-factor penalty may not be symmetric with respect to the amount of offset of SI placement from the mid-point of a transmission distance.

Figure 4:
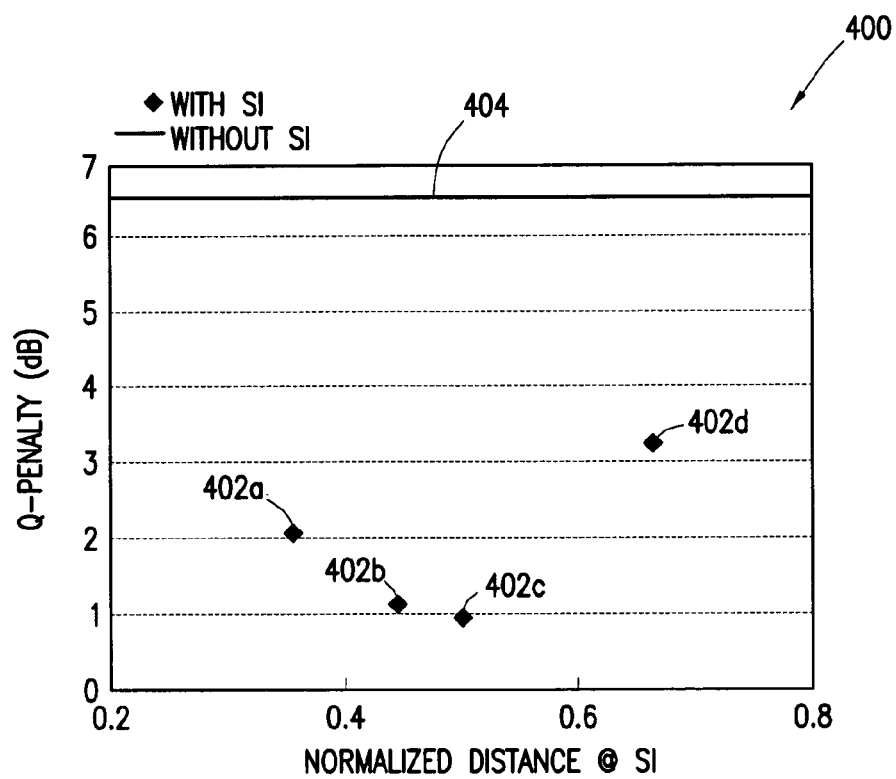
FIG. 4 illustrates a graph of the Q-penalty for optical transmission in a second simulation utilizing SIs as a function of normalized distance of SI placement, in accordance with one embodiment of the present disclosure.

FIG. 4 illustrates graph 400 of the Q-penalty for optical transmission in the second simulation utilizing SIs as a function of SI placement, in accordance with one embodiment of the present disclosure. FIG. 4 is based on the second simulation discussed with reference to FIG. 2, e.g., 10×60 km+10× 75 km spans. To generate plot points 402a-402d, SIs are placed at different locations along the transmission path. For example, plot point 402a corresponds to an SI placed after eight spans, plot point 402b corresponds to an SI placed after ten spans, plot point 402c corresponds to an SI placed after eleven spans, and plot point 402d corresponds to an SI placed after fourteen spans. Line 404 may represent the Q-penalty for the simulation without any SIs.

As can be seen from graph 400, optimum performance may be achieved with mid-span placement of SI, e.g., after approximately eleven spans. However, even with large asymmetric SI placement of approximately 20% of transmission distance, e.g., plot points 402a and 402d, the Q-factor mitigation by SI remains greater than approximately three dB compared to transmission performance without SI (line 404). The Q-factor penalty may not be symmetric with respect to the amount of offset of SI placement from the mid-point of a transmission distance.

FIG. 5 illustrates a block diagram of an example optical transmission path 500 with symmetric multiple SI placement, in accordance with one embodiment of the present disclosure. Path 500 may include ten spans of approximately sixty kilometers and ten spans of approximately seventy-five kilometers, e.g., 10×60 km+10×75 km spans. First SI 508a may be placed after approximately five spans and in the approximate mid-point of the sixty kilometers spans. Second SI 508b may be placed after approximately fifteen spans and in the approximate mid-point of the seventy-five kilometers spans. With no SI placement, the Q-factor penalty may be approximately 5.6 dB. In the illustrated example with two SIs, the Q-factor penalty may be approximately 0.2 dB. Thus, the Q-factor penalty may be improved with two SIs placed approximately in the mid-point of the two sets of spans.

FIG. 6 illustrates a block diagram of an example optical transmission path 600 with asymmetric multiple SI placement, in accordance with one embodiment of the present disclosure. Path 600 may include ten spans of approximately sixty kilometers and ten spans of approximately seventy-five kilometers, e.g., 10×60 km+10×75 km spans. First SI 608a may be placed after approximately three spans. Second SI 608b may be placed after approximately seventeen spans. Again, with no SI placement, the Q-factor penalty may be approximately 5.6 dB. In the illustrated example, the Q-factor penalty may be approximately 0.6 dB. The Q-factor penalty may be small with asymmetric placement of two SIs. As can be seen by comparison of FIGS. 5 and 6, the Q-factor penalty based on asymmetric placement of SIs may be small such that transmission of the optical signal is not adversely affected above a given threshold.

Figure 7:
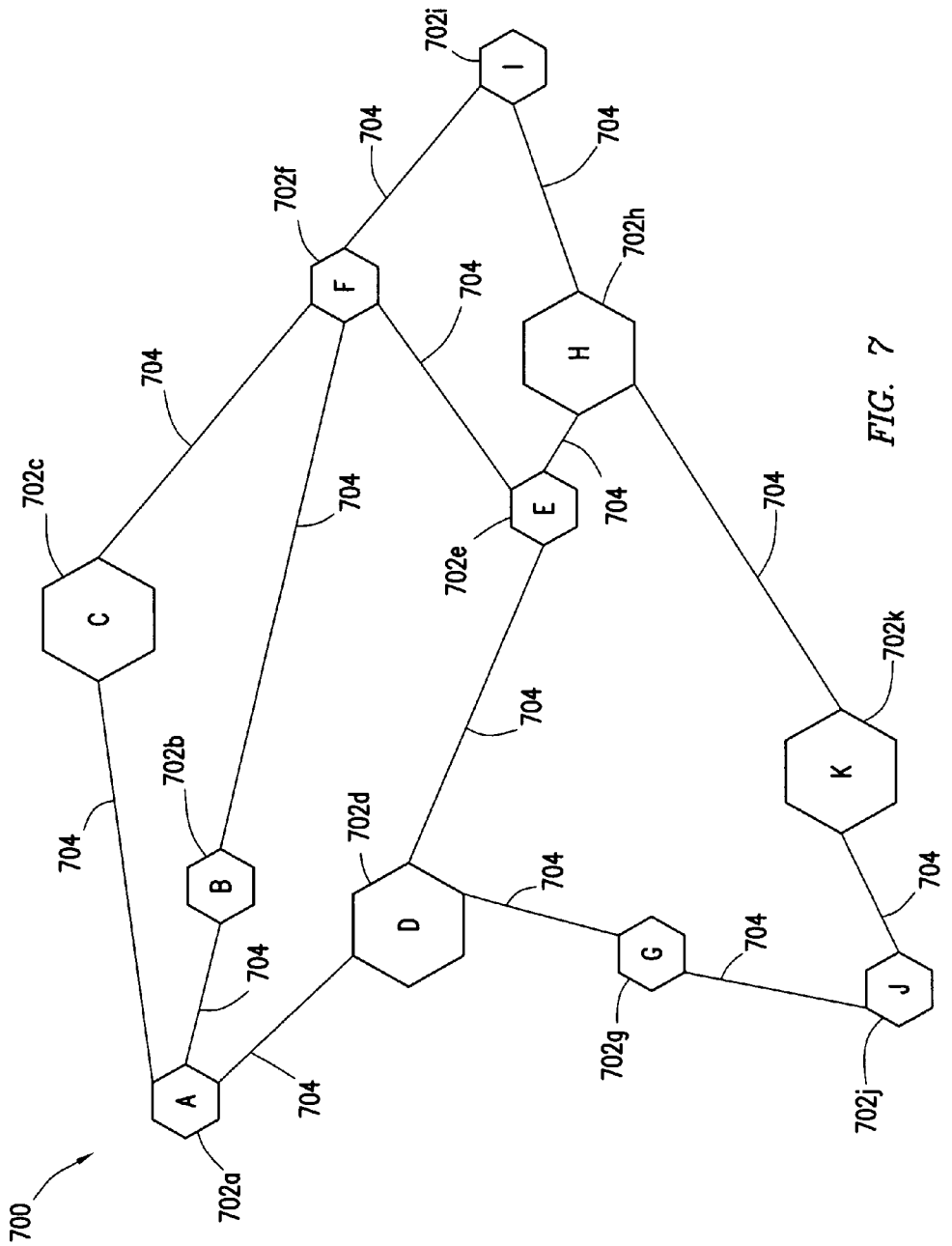
FIG. 7 illustrates a block diagram of an example optical mesh network, in accordance with one embodiment of the present disclosure.

FIG. 7 illustrates a block diagram of an example optical mesh network 700, in accordance with one embodiment of the present disclosure. Optical mesh network 700 may include nodes 702a-702k, collectively referred to as nodes 702, coupled by links 704. During operation, a particular node 702 communicates data with other nodes 702 and/or other components of optical mesh network 700 by optical signals propagating on links 104 at appropriate wavelengths.

In certain embodiments, each node 702 in optical network 700 may include any suitable system operable to transmit and receive traffic. Nodes 702 of optical network 700, coupled by links 704, may include servers, computers, data centers, storage media, transmitters, multiplexers (MUX), amplifiers, optical add/drop multiplexers (OADM), receivers, and/or any other suitable components. Nodes 702 may be referred to as "data center nodes" or "local nodes." In the illustrated embodiment, each node 702 may be operable to transmit traffic directly to and/or receive traffic directly from one or more other node 702 connected by a particular link 704. Additionally, each node 702 may allow traffic to pass-through the node. Further, node 702 may be capable of receiving traffic from and/sending traffic to components external to optical network 700 through an external connection. For example, external connections may connect optical network 700 to other optical networks including those similar in structure and operation to optical network 700.

For ease of reference, nodes 702a-702k may be referred to as nodes A-K. For example, node 702a may be referred to as node A. Node 702b may be referred to as node B, and node 702c may be referred to as node C. Additionally, nodes 702d, 702e, 702f, 702g, 702h, 702i, 702j, and 702k may be referred to as nodes D, E, F, G, H, I, J, and K, respectively.

In optical network 700, each link 704 may consist of multiple spans. Each of the spans may be of similar length or may be a variety of lengths. For ease of reference, each link 704 may be referred to with reference to the particular nodes 102 that each link 704 couples. For example, link 704 between nodes A and B may be referred to as link (A, B). As another example, link 704 between nodes B and F may be referred to as link (B, F).

In some embodiments, SIs may be placed in all nodes 702 of network 700, or SIs may be placed in only on some nodes 702. Placement of SIs may be based on multiple factors including estimated impairments on a selected path, and the optical reach of a signal transmitted on the selected path.

In some embodiments, the NLPN margin requirement ($RNP_{OSNR}$) is the allocated portion of the OSNR budget assigned to NLPN impairment. Margin requirement may be set in transmission system design based on a worst case scenario to avoid system failure. A required received OSNR may be determined by the addition of the OSNR for FEC threshold ($RQ_{OSNR}$) and OSNR margin requirement ($RQM_{OSNR}$) due to various impairments, such as PDL impairment, NLPN impairment, and other suitable impairments. Thus, the required received OSNR may be $RQ_{OSNR}+RQM_{OSNR}$. If NLPN can be fully compensated by SI, then the required received OSNR may be:

$$RQ_{OSNR}+RQM_{OSNR}-RNP_{OSNR}+xOP_{SI}$$

where:
x=number of SIs used in the transmission path; and
$OP_{SI}$=OSNR penalty per SI.

If the estimated received OSNR ($ER_{OSNR}$) for a given transmission path is small such that the following equation is true, then SI may not be effective for a given path:

$$ER_{OSNR} < RQ_{OSNR}+RQM_{OSNR}-RNP_{OSNR}+xOP_{SI} \quad (1)$$

where:
$ER_{OSNR}$=estimated received OSNR;
$RNP_{OSNR}$=NLPN margin requirement;
$RQ_{OSNR}$=required OSNR for FEC threshold; and $RQM_{OSNR}$=OSNR margin requirement due to various impairments including NLPN.

If the estimated received OSNR ($ER_{OSNR}$) for a given transmission path is large enough and the estimated OSNR penalty of NLPN ($ENP_{OSNR}$) is known or calculated for a given SI placement such that the following equation is true, then SI may be assigned to the selected transmission path:

$$ER_{OSNR} > RQ_{OSNR} + RQM_{OSNR} - RNP_{OSNR} + ENP_{OSNR} + xOP_{SI} \quad (2)$$

A NLPN penalty threshold may be defined such that if the following is true then an SI may be assigned to the selected transmission path:

$$\text{NLPN penalty threshold} = ER_{OSNR} - RQ_{OSNR} - RQM_{OSNR} + RNP_{OSNR} - xOP_{SI} > ENP_{OSNR} \quad (3)$$

In some embodiments, Q-factor may be used instead of OSNR. Further, $ER_{OSNR}$ may be calculated using the following equation:

$$ER_{OSNR}(dB) = 58 + Pin - NF - 10*\log(M) - 10*\log(N)$$

where:
58=power density in 0.1 nm bandwidth (dBm)
Pin=input power to EDFA (dBm)
NF=noise figure of EDFA (dB)
M=number of spans
N=number of optical channels.

Any suitable technique or equation may be utilized to determine each of the above variables. In some system designs, the most severe $ER_{OSNR}$ and $xOP_{SI}$ may be used for design parameters if the maximum number of transmission spans (or maximum transmission distance) with maximum number of SIs is specified. In that case, the NLPN penalty threshold may be defined as an NLPN margin requirement.

In some embodiments, optical signals may be transmitted between any of nodes A-K and the number and location of SIs required for a particular transmission path may be determined. The analysis may include evaluating each possible path between a source and destination node, and evaluating placement of an SI at each intermediate node in each of the possible paths.

For example, an optical signal may be transmitted between node J and node H. As discussed with reference to FIGS. 3 and 4, an SI may be installed in a variety of location on the selected path. The shortest path may be initially selected for evaluation, e.g., the path from node J through node K to node H or links (J, K) and (K, H). The selected path may be evaluated with the assumed assignment of one SI. With one SI assigned, the impairments on the selected path may be less than a threshold level of allowed impairments. Further, the optical reach of the signal may be determined for the selected path. As discussed with reference to FIG. 4, the SI could be located on a node offset from the mid-point of the transmission path based on a given NLPN penalty threshold. For example, if the NLPN penalty threshold is calculated to be approximately 2.5 dB, then the offset may be up to approximately 15% of the transmission distance. As another example, if the NLPN penalty threshold is set to be approximately 3 dB, then the offset may be up to approximately 20% of the transmission distance. A node may be selected for placement of the SI, such as node K. The estimated OSNR penalty of NLPN may be calculated for transmission in both directions, e.g., from node H to node J and from node J to node H, and the higher penalty may be recorded. Because there are no remaining nodes to be evaluated, the estimated OSNR penalty of NLPN may be compared to the NLPN penalty threshold. If the estimated OSNR penalty of NLPN is less than the NLPN penalty threshold, the SI may be assigned to node K.

As another example, an optical signal may be transmitted between node A and node F. Each path between node A and node F may be evaluated for transmission beginning with the shortest path. Each available node on each path may be evaluated for OSNR penalty of NLPN based on transmission in both directions. The highest estimated OSNR penalty of NLPN may be recorded for each available node on each path and compared. Although the transmission path through nodes A, B and F may be the shortest path, this path may have a higher estimated OSNR penalty of NLPN than the transmission path through nodes A, C, and F because of the symmetrical location of node C or any other suitable factor. Thus, the SI may be assigned to node C.

As a further example, an optical signal may be transmitted between node A and node I. Each path between node A and node I may be evaluated for transmission beginning with the shortest path. For each path, each available node on each path may be evaluated for OSNR penalty of NLPN based on transmission in both directions. For example, node E may not be an available node due to maintenance concerns or other factors. The highest estimated OSNR penalty of NLPN may be recorded for each available node on each path and compared. The node on the path that achieves the lowest estimated OSNR penalty of NLPN may be selected. For example, in the path between node A and I that traverses nodes D and H may be identified. However, in the current example, no single node may provide the necessary NLPN mitigation. Thus, the NLPN mitigation may not be adequate for a single SI placed at node D or node H. Accordingly, the number of SIs to be installed in the transmission path may be increased from one to two, and the identified path may be reevaluated. It may be determined that the impairments on the identified path with the assignment of two SIs is less than a threshold level of allowed impairments. The estimated OSNR penalty of NLPN may be calculated for transmission in both directions, e.g., from node A to node I and from node I to node A, and the higher penalty may be recorded. The estimated OSNR penalty of NLPN may be compared to the NLPN penalty threshold. If the estimated OSNR penalty of NLPN is less than the NLPN penalty threshold, the SIs may be assigned to node D and node H.

Figure 8A:
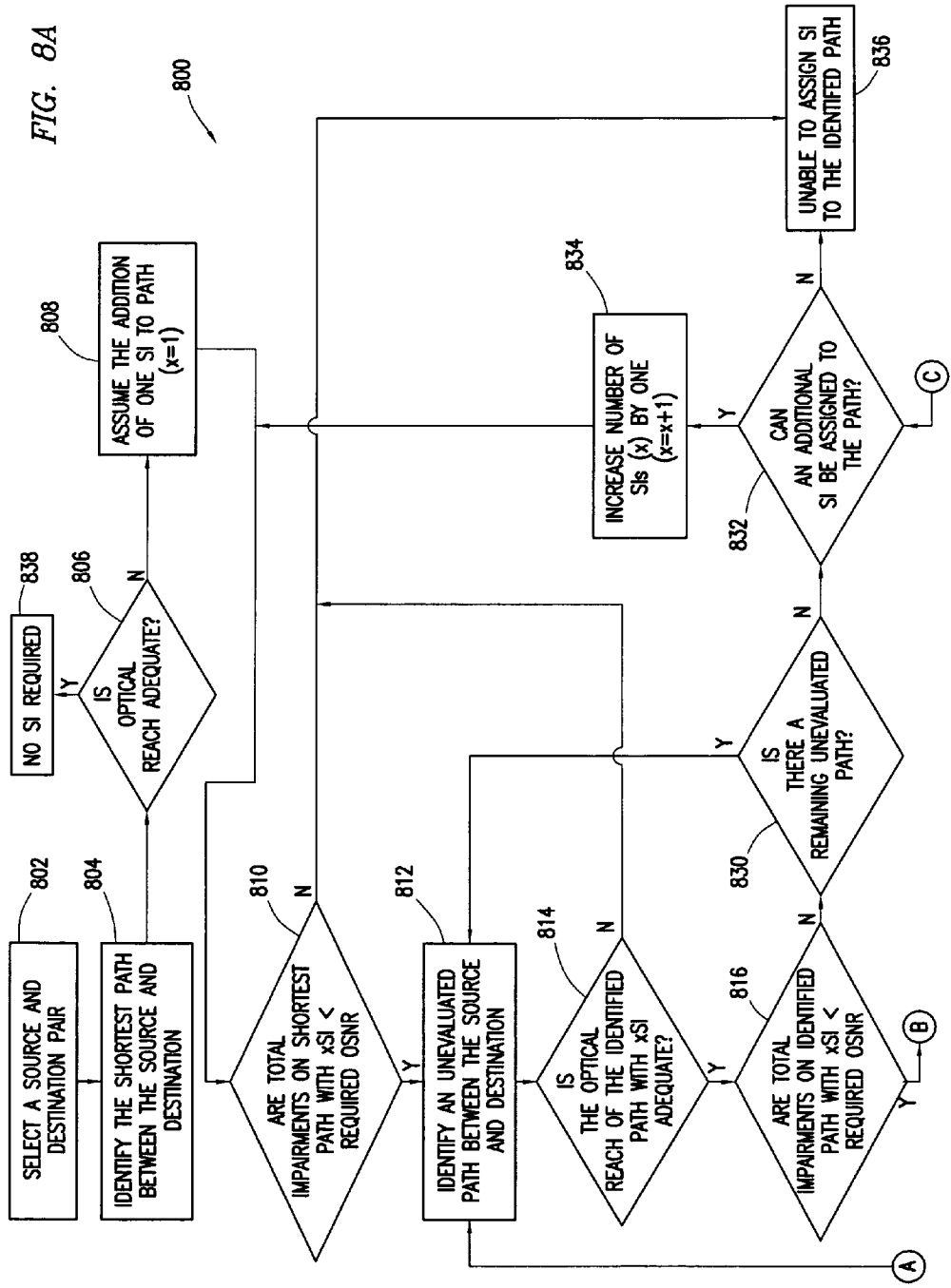
FIGS. 8A and 8B illustrate a flowchart of a method for flexible placement of SIs in optical networks, in accordance with one embodiment of the present disclosure.
Figure 8B:
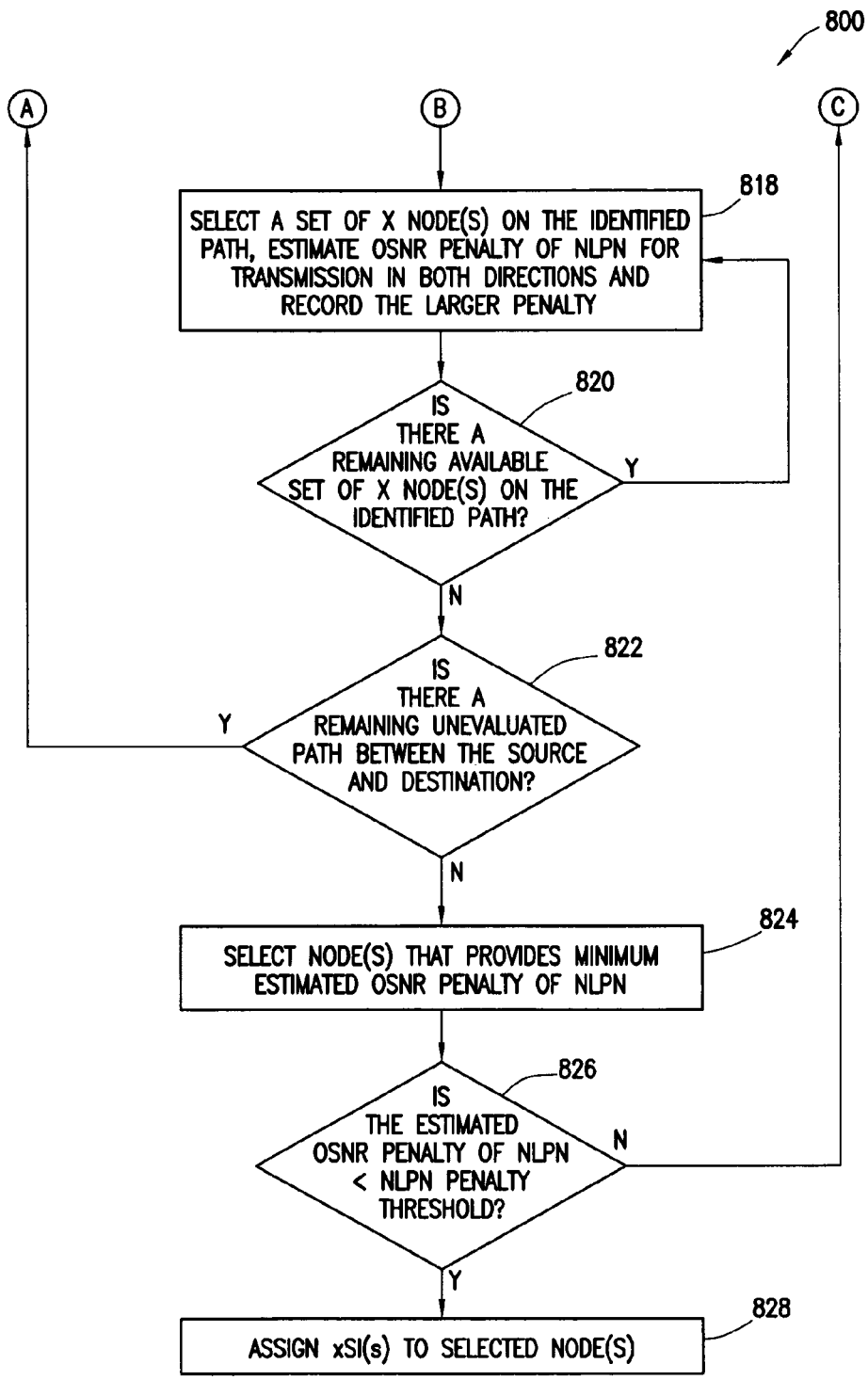

Additionally, an OPC-based SI may be installed to serve multiple flows of traffic through a node. For example, traffic between nodes A and H may utilize an SI at node D. Traffic between nodes J and E may also utilize an SI at node D. An OPC-based SI at node D may serve both traffic between nodes A and H and traffic between nodes J and E FIGS. 8A and 8B illustrate a flowchart of method 800 for flexible placement of SIs in optical networks, in accordance with one embodiment of the present disclosure. Method 800 may be implemented fully or in part by a computing system of FIG. 9 discussed below. The steps of method 800 may be performed by hardware, software, firmware or any combination thereof, configured to evaluate flexible placement of SIs. The software or firmware may include instructions stored on computer-readable medium, and operable to perform, when executed, one or more of the steps described below. The computer-readable media may include any system, apparatus or device configured to store and retrieve programs or instructions such as a hard disk drive, a compact disc, flash memory or any other suitable device. The software or firmware may be configured to direct a processor or other suitable unit to retrieve and execute the instructions from the computer-readable media. For illustrative purposes, method 800 is described with respect to network 700 of FIG. 7; however, method 800 may be used for flexible placement of SIs on any suitable network. In addition, although FIGS. 8A and 8B disclose a certain order of steps to be taken with respect to method 800, the steps comprising method 800 may be completed in any suitable order.

In step 802, the computing system selects a source and destination, or transmitter and receiver, pair for the transmission of an optical signal. For example, the computing system may select transmitter 102 and receiver 112 as discussed with reference to FIG. 1 or nodes A and F discussed with reference to FIG. 7.

In step 804, the computing system may identify the shortest path between the source and destination. For example, in a mesh network, such as mesh network 700 discussed with reference to FIG. 7, there may be multiple paths between two nodes. For example, between nodes A and F, there may be a path that traversed node C and another path that traverses node B. The computing system may choose the shortest path for evaluation.

In step 806, the computing system may determine if the optical reach of the shortest path is adequate. If the optical signal has sufficient optical reach, then assignment of an SI to the transmission path is not necessary. Thus, if the optical reach of the shortest path is adequate, method 800 may proceed to step 838 where the computing system may determine that no SI is needed. If the optical reach is not adequate, method 800 may proceed to step 808.

In step 808, the computing system assumes the addition of one SI to the identified path (e.g., x=1). For example, between nodes A and F, the computing system may assume that one SI may be added to the transmission path.

In step 810, the computing system may determine the total impairment on the shortest transmission path accounting for the addition of x number of SIs to the path. For example, x may be one or more. Further, the computing system may have previously established a required OSNR, discussed with reference to Equation (1) and FIG. 7. If the impairments excluding NLPN margin requirement on the shortest transmission path is less than the required OSNR, then method 800 proceeds to step 812, if not, method 800 proceeds to step 836.

In step 812, the computing system identifies an unevaluated transmission path between the source and the destination. The unevaluated path may be the shortest path identified in step 804 or may be any other transmission path between the source and destination. For example, as shown with reference to FIG. 7, the computing system may identify the path between nodes A and F that traverses node B.

In step 814, the computing system determines if the optical reach of the signal on the identified transmission path with x number of SIs is adequate. For example, the computing system may determine that a signal transmitted between nodes A and F with one SI may have adequate optical reach. If the computing system determines there is adequate optical reach, method 800 may proceed to step 816, if not method 800 may proceed to step 832.

In step 816, the computing system may determine the impairments excluding NLPN margin requirement on the identified transmission path accounting for the addition of x number of SIs to the path. In some embodiments, step 816 may be repetitive of step 810, e.g., if the identified transmission path is also the shortest transmission path. Further, the computing system may have previously established a required OSNR, discussed with reference to Equation (1) and FIG. 7. If the impairments excluding NLPN margin requirement on the identified transmission path is less than the required OSNR, then method 800 proceeds to step 818, if not, method 800 proceeds to step 830.

In step 830, the computing system determines if there are remaining unevaluated paths between the source and destination. If there are remaining paths to be evaluated, method 800 returns to step 812. If there are no remaining unevaluated paths, method 800 proceeds to step 832.

In step 818, the computing system selects a set of x node(s) in the identified transmission path and estimates the OSNR penalty of NLPN for transmission in both directions (e.g., Equations (2) and (3)). For example, in FIG. 7 showing transmission between nodes A and F, node B may be selected as an available node when x is one. The estimated OSNR penalty of NLPN may be determined for transmission from node A to F and then from node F to A. Then the computing system records the higher of the two OSNR penalties of NLPN.

In step 820, the computing system determines if there is a remaining available set of x node(s) on the identified transmission path. For example, in FIG. 7 showing transmission between nodes A and F, there may be no remaining node on the identified transmission path after evaluating node B. An available node is a node that can support the assignment of an SI. As another example, if x is two (e.g., 2 SIs), then in the path between nodes A and I, there may be three possible sets of node pairs that are available, (D,E), (D,H), and (E,H). However, as example, in the path between nodes A and I, node E may not be considered an available node because of maintenance constraints that may not allow assignment of an SI to node E. If there are remaining available nodes to be evaluated, method 800 returns to step 818, if not, method 800 proceeds to step 822.

In step 822, the computing system determines if there is a remaining unevaluated path between the source and destination. If there is a remaining path to be evaluated, method 800 returns to step 812. If there are no remaining unevaluated paths, method 800 proceeds to step 824.

In step 824, the computing system selects the node that provides the minimum estimated OSNR penalty of NLPN. For example, in the path between node A and F, although nodes A, B, and F may be the shortest path, nodes A, C, and F may have a lower OSNR penalty of NLPN because of symmetric placement of node C.

In step 826, the computing system may determine if the estimated OSNR penalty of NLPN is less than the NLPN penalty threshold. The NLPN penalty threshold may have been preselected by the computing system. If the OSNR penalty of NLPN is less than the NLPN penalty threshold, then the SI may be assigned to the node in step 828. If the OSNR penalty of NLPN is greater than the NLPN penalty threshold, method 800 may proceed to step 832.

In step 832, the computing system determines if an additional SI can be added to the identified transmission path. For example, if there is more than one available node in the identified transmission then two, three or more SIs may be added to the transmission path. If additional SIs can be added, method 800 proceeds to step 834 and the number of SIs (x) is incremented (e.g., x=x+1). Then method 800 returns to step 810.

If at step 832, an additional SI cannot be added to the identified transmission path, then method 800 proceeds to step 836. In step 836, the computing system determines that an SI is unable to be assigned to the identified path. For example, the identified path may require the addition of a regenerator before an SI would be effective.

Figure 9:
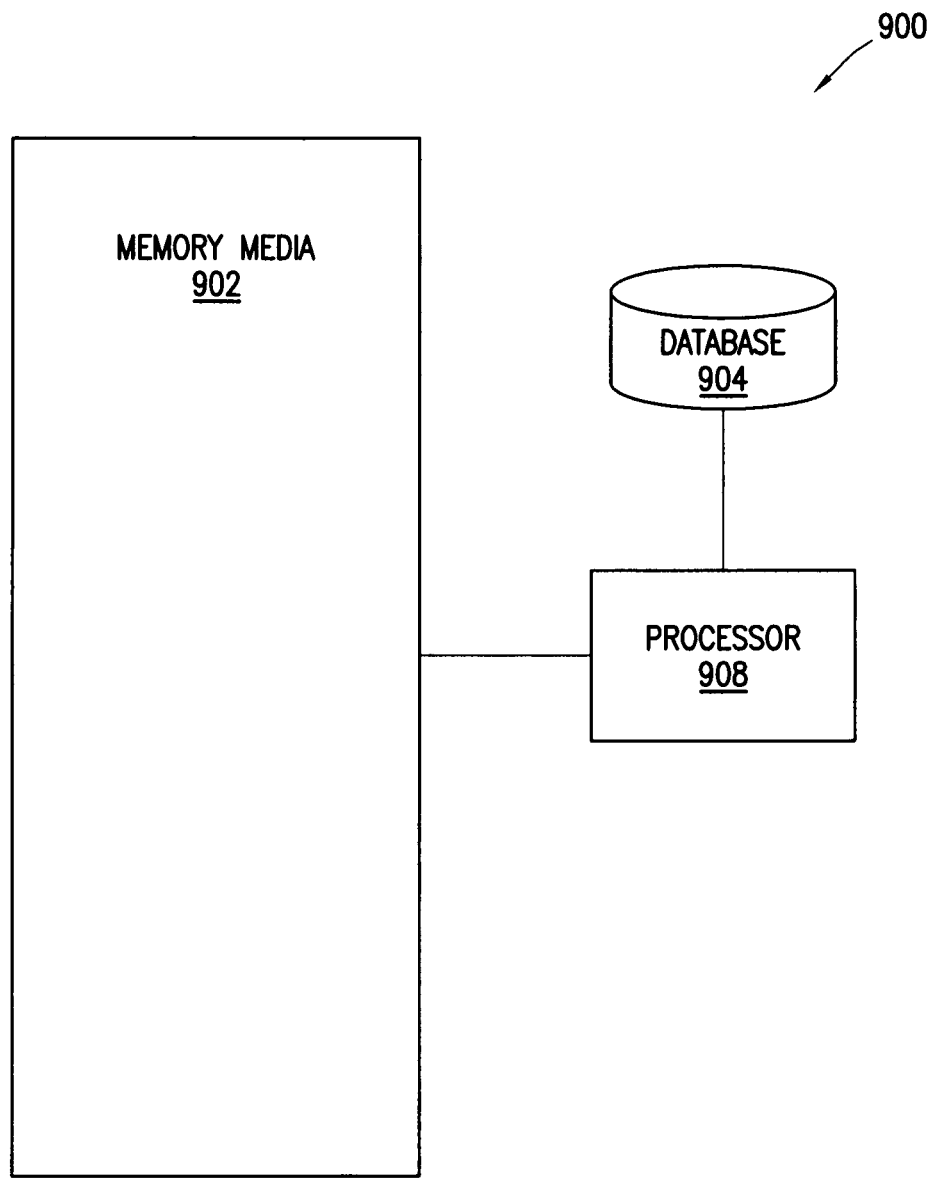
FIG. 9 illustrates a block diagram of selected elements of a computing system for flexible placement of SIs in an optical network, in accordance with one embodiment of the present disclosure.

FIG. 9 illustrates a block diagram of selected elements of computing system 900 for flexible placement of SIs in an optical network, in accordance with one embodiment of the present disclosure. Computing system 900 may execute method 800 discussed with reference to FIGS. 8A and 8B. Computing system 900 includes processor 908 and memory media 902, which may store executable instructions (i.e., executable code) that may be executable by processor 908, which has access to memory media 902. Processor 908 may execute instructions that cause computing system 900 to perform the functions and operations described herein. For the purposes of this disclosure, memory media 902 may include non-transitory computer-readable media that stores data and/or instructions for at least a period of time. Memory media 902 may comprise persistent and volatile media, fixed and removable media, and magnetic and semiconductor media. Memory media 902 may include, without limitation, storage media such as a direct access storage device (e.g., a hard disk drive or floppy disk), a sequential access storage device (e.g., a tape disk drive), compact disk (CD), random access memory (RAM), read-only memory (ROM), CD-ROM, digital versatile disc (DVD), electrically erasable programmable read-only memory (EEPROM), and/or flash memory; non-transitory media; and/or various combinations of the foregoing. Memory media 902 is operable to store instructions, data, or both. Memory media 902 as shown includes sets or sequences of instructions that may represent executable computer programs and/or represent code for implementing various algorithms according to the present disclosure.

In certain embodiments, computing system 900 may be configured to interface with a person (i.e., a user) and receive data about the optical signal transmission path. For example, computing system 900 may also include and/or may be coupled to one or more input devices and/or output devices to facilitate receiving data about the optical signal transmission path from the user and/or outputting results to the user. The one or more input and/or output devices (not shown) may include, but are not limited to, a keyboard, a mouse, a touchpad, a microphone, a display, a touchscreen display, an audio speaker, or the like. Alternately or additionally, computing system 900 may be configured to receive data about the optical signal transmission path from a device such as another computing device and/or a network element (not shown in FIG. 2).

Database 904 may be communicatively coupled to processor 908 and may be populated with resource information to support traffic engineering, which may include link bandwidth availability. Further, database 904 may be populated with information usable to determine a network topology of an optical network, and information to determine transmission characteristics of an optical signal transmission path.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for placement of spectral inverters in an optical network, comprising:
    identifying a first transmission path coupling a transmitter and a receiver, the first transmission path including a first node for assignment of a first spectral inverter;
    estimating a first optical signal-to-noise ratio (OSNR) penalty of nonlinear phase noise (NLPN) on the first transmission path with the first spectral inverter assigned to the first node by
        evaluating the OSNR penalty of NLPN from the transmitter to the receiver and from the receiver to the transmitter, and
        selecting the higher OSNR penalty of NLPN as the first estimated OSNR penalty of NLPN; and
    based on the first estimated OSNR penalty of NLPN being less than an NLPN penalty threshold, assigning the first spectral inverter to the first node.

2. The method of claim 1, wherein the first node is located asymmetrically between the transmitter and the receiver.

3. The method of claim 1, further comprising identifying a second node in the first transmission path for assignment of the first spectral inverter, wherein assigning the first spectral inverter to the second node is further based on:
    estimating a second OSNR penalty of NLPN based on the first spectral inverter placed at the second node; and
    determining the second estimated OSNR penalty of NLPN is equal to or greater than the first estimated OSNR penalty of NLPN.

4. The method of claim 1, further comprising determining if an optical signal from the transmitter can be received by the receiver with the use of the spectral inverter.

5. The method of claim 1, further comprising:
    identifying a second transmission path between the transmitter and the receiver, the second transmission path including a second node for assignment of the first spectral inverter;
    estimating a second OSNR penalty of NLPN on the second transmission path with the first spectral inverter assigned to the second node of the second transmission path; and
    determining the second OSNR penalty of NLPN on the second transmission path is greater than the first NLPN on the first transmission path.

6. The method of claim 1, further comprising:
    based on the first OSNR penalty of NLPN being equal to or greater than an NLPN penalty threshold, determining if a second spectral inverter can be assigned to a second node on the first transmission path.

7. An optical network system for placement of spectral inverters, comprising:
    a transmitter;
    a receiver coupled to receive a signal transmitted by the transmitter;
    a first transmission path coupling the transmitter and the receiver, the first transmission path including a first node;
    a first spectral inverter assigned to the first node on the first transmission path, the first node selected for assignment based on:
        estimating a first optical signal-to-noise ratio (OSNR) penalty of nonlinear phase noise (NLPN) on the first transmission path with the first spectral inverter assigned to the first node by
            evaluating the OSNR penalty of NLPN from the transmitter to the receiver and from the receiver to the transmitter, and
            selecting the higher OSNR penalty of NLPN as the first estimated OSNR penalty of NLPN; and
        based on the first estimated OSNR penalty of NLPN being less than an NLPN penalty threshold, assigning the first spectral inverter to the first node.

8. The optical network system of claim 7, wherein the first node is located asymmetrically between the transmitter and the receiver.

9. The optical network system of claim 7, further comprising the first transmission path including a second node, and wherein assigning the first spectral inverter to the first node is further based on:
  estimating a second OSNR penalty of NLPN based on the first spectral inverter placed at the second node; and
  determining the second estimated OSNR penalty of NLPN is equal to or greater than the first estimated OSNR penalty of NLPN.

10. The optical network system of claim 7, wherein the first node selected for assignment is further based on determining if an optical signal from the transmitter can be received by the receiver with the use of the spectral inverter.

11. The optical network system of claim 7, further comprising:
  a second transmission path between the transmitter and the receiver, the second transmission path including a second node for assignment of the first spectral inverter; and
  wherein the first node selected for assignment is further based on:
  estimating a second OSNR penalty of NLPN on the second transmission path with the first spectral inverter assigned to the second node of the second transmission path; and
  determining the second OSNR penalty of NLPN on the second transmission path is greater than the first OSNR penalty of NLPN on the first transmission path.

12. The optical network system of claim 7, wherein the first node selected for assignment is further based on:
  determining if the first OSNR penalty of NLPN is equal to or greater than an NLPN penalty threshold; and
  determining if a second spectral inverter can be assigned to a second node on the first transmission path.

13. A system for placement of spectral inverters, comprising:
  a processor configured to access non-transitory computer readable memory media, wherein the memory media store processor-executable instructions, the instructions, when executed by a processor, cause the processor to:
  identify a first transmission path coupling a transmitter and a receiver, the first transmission path including a first node for assignment of a first spectral inverter;
  estimate a first optical signal-to-noise ratio (OSNR) penalty of nonlinear phase noise (NLPN) on the first transmission path with the first spectral inverter assigned to the first node by
    evaluating the OSNR penalty of NLPN from the transmitter to the receiver and from the receiver to the transmitter, and
    selecting the higher OSNR penalty of NLPN as the first estimated OSNR penalty of NLPN; and
  based on the first estimated OSNR penalty of NLPN being less than an NLPN penalty threshold, assign the first spectral inverter to the first node.

14. The system of claim 13, wherein the first node is located asymmetrically between the transmitter and the receiver.

15. The system of claim 13, further comprising instructions to identify a second node in the first transmission path for assignment of the first spectral inverter, wherein the instructions to assign the first spectral inverter to the first node include instructions to:
  estimate a second OSNR penalty of NLPN based on the first spectral inverter placed at the second node; and
  determine the second estimated OSNR penalty of NLPN is equal to or greater than the first estimated NLPN.

16. The system of claim 13, further comprising instructions to determine if an optical signal from the transmitter can be received by the receiver with the use of the spectral inverter.

17. The system of claim 13, further comprising instructions to:
  identify a second transmission path between the transmitter and the receiver, the second transmission path including a second node for assignment of the first spectral inverter;
  estimate a second OSNR penalty of NLPN on the second transmission path with the first spectral inverter assigned to the second node of the second transmission path; and
  determine the second OSNR penalty of NLPN on the second transmission path is greater than the first OSNR penalty of NLPN on the first transmission path.

* * * * *